No. 771,634.

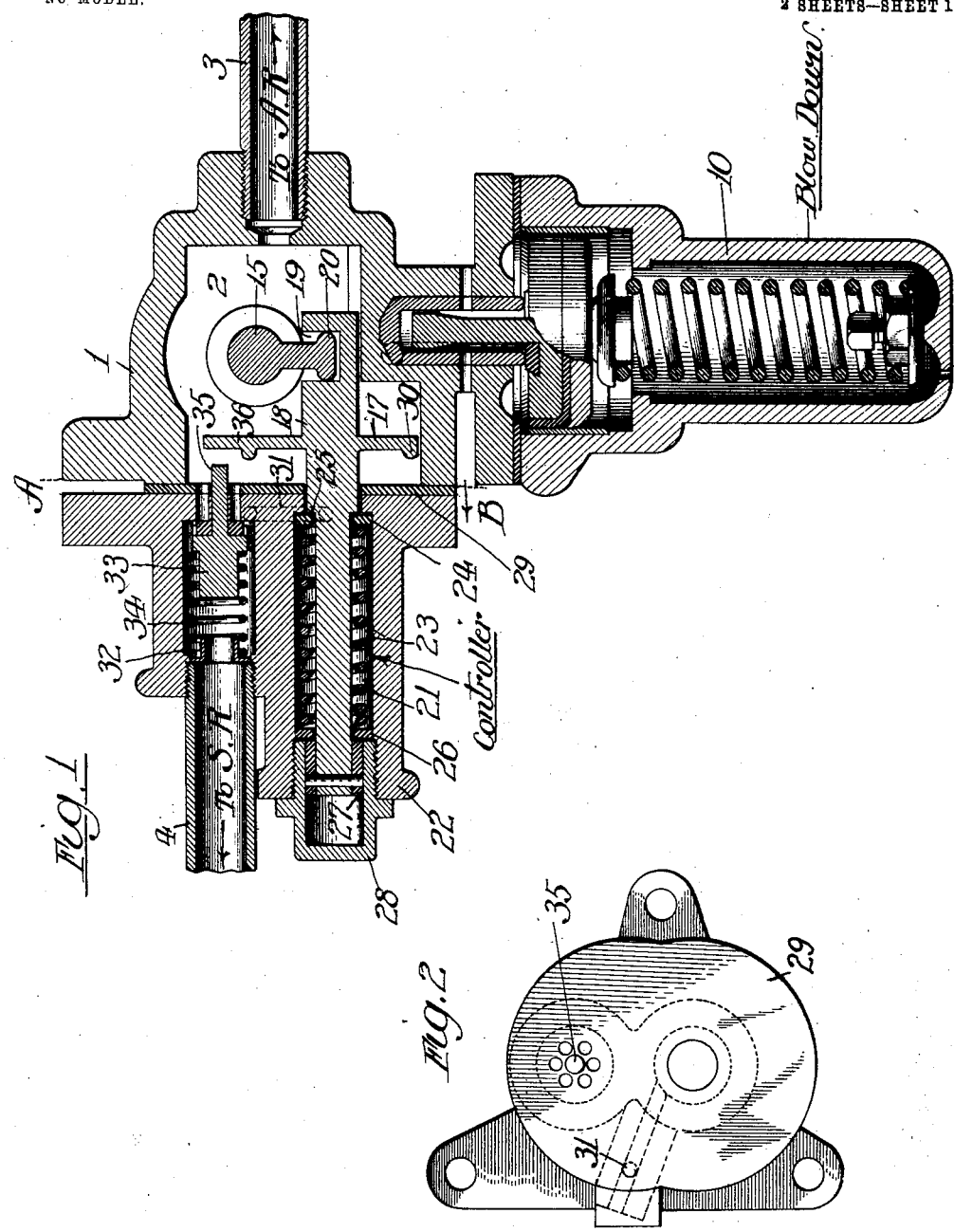

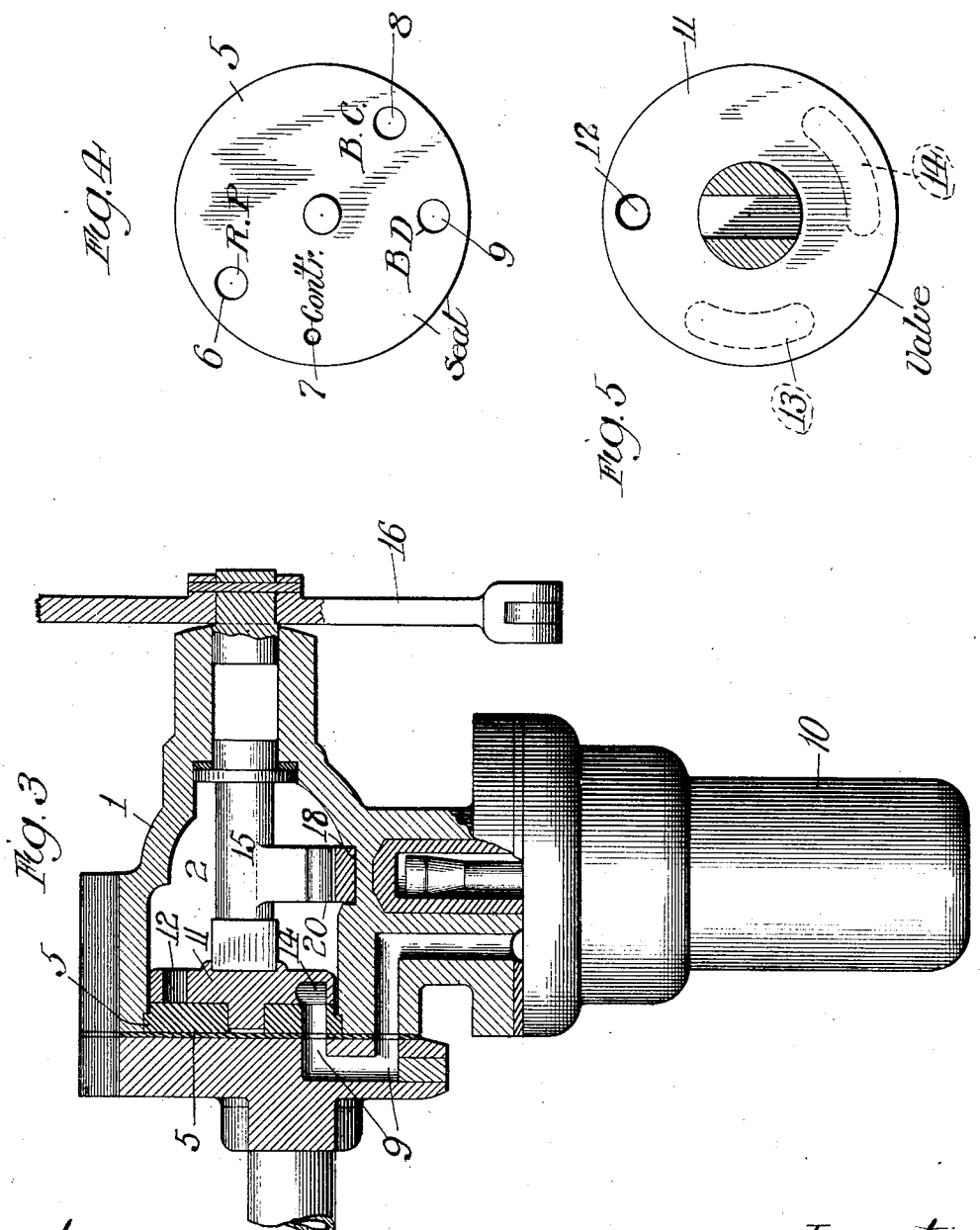

Patented October 4, 1904.

UNITED STATES PATENT OFFICE.

MAURY W. HIBBARD, OF CHICAGO, ILLINOIS, ASSIGNOR TO RICHARD FITZGERALD, OF CHICAGO, ILLINOIS.

FLUID-PRESSURE BRAKE SYSTEM.

SPECIFICATION forming part of Letters Patent No. 771,634, dated October 4, 1904.

Application filed March 13, 1903. Serial No. 147,593. (No model.)

*To all whom it may concern:*

Be it known that I, MAURY W. HIBBARD, residing at Chicago, Cook county, Illinois, have invented certain new and useful Improvements in Fluid-Pressure Brake Systems, of which the following is a specification.

My invention pertains to apparatus for providing a partial braking pressure for a car empty and a full or increased braking pressure for a car loaded, according to the same general principles involved in my prior Letters Patent, Nos. 683,205 and 699,386, issued on September 24, 1901, and May 6, 1902, respectively, and in my pending application, filed February 25, 1903, Serial No. 145,018.

In the drawings, Figure 1 is a section of a valve apparatus embodying my present invention; Fig. 2, a section on line A B of Fig. 1; Fig. 3, a sectional elevation of my valve apparatus, the section being taken on the line C D of Fig. 1; Fig. 4, a plan of the valve-seat, and Fig. 5 a plan of the valve.

The main valve of my present construction is of the same general character and operation as that of my prior patent, No. 699,386, to which reference may be had for a more detailed description of the construction than intended to be given herein. In the present instance the main valve is of the rotary type, as in said Patent No. 699,386; but the automatic valve locking and controlling device is arranged within the same casing as the main valve and closely associated therewith in the same general manner as in my said pending application.

Referring to the drawings, the valve-casing 1 is provided with an interior chamber 2, arranged to communicate with the usual auxiliary reservoir (A R) of the brake equipment of a car through the pipe or connection 3 and with the supplemental reservoir (now well known in my system of braking) through the pipe or connection 4. At one side of the valve-chamber is fixed a valve-seat 5, preferably of brass and having terminating or opening on its face the several ports shown in Fig. 4—that is to say, first, a release-port 6 (R P) or exhaust to atmosphere; second, a port 7 from the automatic lock or controller, (Contr.,) as hereinafter described; third, a port 8 (B C) leading from the brake-cylinder, and, fourth, a port 9 (B D) leading to a pressure-reducing or blow-down device 10, that may be of the same general construction as that of my prior Patent No. 699,386.

The main valve 11 works upon the valve-seat 5 and is provided with suitable means to control said ports on such seat. In the present instance this valve is provided with a transverse port 12 and two circular or curved recesses 13 and 14. The valve is operated by a stem 15, projecting through the casing and into the valve-chamber and capable of rocking or oscillating the valve to which it is operatively connected in suitable manner. To the outer end of this valve-stem is attached the operating-lever 16, connected with the usual bleed-rods extending to opposite sides of the car.

The automatic valve lock or controller comprises in the present instance a holding-disk 17, operating in the valve-chamber 2 and actuated by the valve-stem. To this end the holding-disk has a stem 18 extending from opposite sides of the disk, the inner end of which stem adjacent the valve-stem 15 is provided with a slot or socket 19, receiving a depending lug 20 of the valve-stem, with the result that when the valve and its stem are rocked the holding-disk is reciprocated in one direction or the other, according to the direction of movement of the valve. The outer end of the stem of the holding-disk projects into a chamber 21, formed in a block or extension piece 22, secured in suitable manner to the valve-casing 1. A coiled spring 23 is arranged within the chamber 21 and surrounds the stem 18 therein. The function of this spring is to normally keep the valve in the position shown—that is, "empty-car" position, and to restore the parts to such normal position after a movement either to "bleed" position or to "loaded-car" position. For this purpose the spring bears at one end against a ring 24, arranged to abut a shoulder 25 on the stem 18, and bears at the other end against a ring 26, arranged to abut a sleeve 27, pinned or otherwise secured to the outer end of such stem 18, and also to abut the inner end of a hollow screw-cap 28, all as clearly shown in Fig. 1.

The left-hand wall, Fig. 1, of the valve-chamber is provided with a gasket 29 or the like to form a seat for the annular bead or flange 30 on one face of the holding-disk, with the result that when this disk is seated by movement of the valve for loaded-car braking and the pressure thereupon exhausted, as hereinafter explained, from the inner or left hand side thereof, Fig. 1, the pressure of the valve-chamber exerted on the other side will hold the disk seated, and consequently keep the parts to their shifted position, which is loaded-car position. The stem 18 of the holding-disk passes loosely through the gasket and wall of the block 22, thereby permitting of the communication for the air-pressure between the valve-chamber 2 and the spring-chamber 21. To provide for the exhausting of this latter chamber, a small passage 31 leads therefrom, as seen in Figs. 1 and 2, and opens out as the controller-port 7 upon the valve-seat 5.

If desired, the communication between the valve-chamber and the supplemental reservoir may be provided with a check-valve, which in the present instance is a loaded valve. As shown, the block or extension-piece 22 is provided with a valve-chamber 32, communicating with the valve-chamber 2 and the supplemental reservoir 4, in which chamber 32 is arranged a check-valve 33 normally held pressed to the right, Fig. 1, and upon its seat by the spring 34. The check-valve spring is of a sufficient predetermined tension to hold the check-valve seated against a certain auxiliary reservoir pressure—say fifty pounds—so that no pressure will be admitted into the supplemental reservoir until this predetermined pressure has been reached. The check-valve normally prevents the flow of air under pressure from the supplemental reservoir to the main valve-chamber; but in order to open the valve and hold it open for loaded-car braking, so as to obtain the combined volumes of the two reservoirs for braking purposes, the check-valve is provided with a stem 35, projecting into the valve-chamber 2 and into the path of movement of an extension or finger 36 on the upper side of the holding-disk, with the result that when such disk is reciprocated to the left, Fig. 1, the check-valve is opened and held opened so long as the disk is maintained in such shifted or adjusted position.

When the parts are in the normal position shown, the brake system of the car operates in the well-known way, with the additional result that owing to the coöperation at this time of the pressure-regulating device or blow-down the brake-cylinder pressure is prevented from exceeding a predetermined amount in service application of the brakes and is reduced to such predetermined amount in emergency application, all as is usual and well understood in my system now in use. In normal position the only ports connected by the main valve are the ports 8 and 9, connected by the recess 14, whereby the brake-cylinder is brought into communication with the blow-down. Furthermore, the braking is done at this time by auxiliary reservoir-pressure alone, inasmuch as the check-valve cuts off the flow from the supplementary reservoir. For loaded-car braking the main valve is partially rotated in a clockwise direction through the pushing inward by the trainman of one of the "bleed-rods," with the result that the lug 20 on the main valve-stem forces the controller-stem 18 to the left, Fig. 1, and thereby causes the holding-disk to seat on the gasket 29. This movement of the controller-stem is against the tension of the helical spring 23, which becomes compressed, inasmuch as the ring 26 is limited and the other ring, 24, is moved by the stem 18 outwardly to the left. When the holding-disk is thus seated, the main valve cuts the blow-down out of service and with its recess 13 connects the controller-port 7 with the release or exhaust port 6, whereupon the pressure in the controller-chamber and also upon the left-hand side of the holding-disk is released. The pressure in the valve-chamber 2 now holds the disk to its seat against the tension of its spring and maintains such adjusted position of the parts as long as sufficient air-pressure remains in the valve-chamber to overcome the restoring-spring 23. When the holding-disk is shifted to the left, as just described, its finger 36 forces the check-valve open and holds the same open, with the result that the two reservoirs are now connected and the combined volumes thereof made available for braking purposes and increased braking power thereby obtained. Whenever the pressure in the main valve-chamber ceases from any cause the controller-spring acts to restore the movable parts to empty-car position. To bleed the reservoir, the trainman pulls one of the bleed-rods outwardly, and thereby partially rotates the main valve in an anticlockwise direction against the tension of the controller-spring. In this shifted or adjusted position of the valve the port 12 is brought into register with the exhaust-port 6, and the auxiliary reservoir is consequently exhausted or bled.

I claim—

1. In combination with an air-brake system and a supplemental reservoir therefor, a device adapted to be adjusted for braking a car in proportion to its empty and its loaded weight and comprising a casing having a valve-chamber in communication with the supplemental reservoir and the auxiliary reservoir, and arranged in said chamber, and a controller comprising a holding-disk adapted to be seated in loaded-car braking and connected with the valve to hold it when adjusted, said valve being arranged to exhaust the air from one side of such disk, said reservoirs communicating with each other through the valve-chamber independently of the valve.

2. In combination with an air-brake system and a supplemental reservoir, a valve-casing having a chamber in communication with said reservoirs, a main valve operating in said chamber, and a controller arranged to hold said valve in an adjusted position and comprising a holding-disk located in such chamber and adapted to seat therein, a stem for said disk, and a stem for said valve adapted to operatively engage and actuate said stem of the disk, said casing having a passage leading from the chamber on the seating side of the disk and governed by said main valve.

3. In combination with an air-brake system and a supplemental reservoir, a valve-casing having a chamber in communication with said reservoirs, a main valve operating in said chamber, and a controller arranged to hold said valve in an adjusted position and comprising a holding-disk located in such chamber and adapted to seat therein, a stem for said disk and provided with a slot, and a stem for said valve provided with a lug received by said slot whereby said disk partakes of the movements of the valve, said casing having a passage leading from the chamber on the seating side of the disk and governed by said main valve.

4. In combination with an air-brake system and a supplemental reservoir, a valve-casing having a chamber in communication with said reservoirs, a main valve operating in said chamber, and a controller arranged to hold said valve in an adjusted position and comprising a holding-disk located in such chamber and adapted to seat therein, a stem for said disk and provided with a slot, and a stem arranged at right angles to the disk-stem and having a depending lug received by said slot whereby said disk partakes of the movements of the valve, said casing having a passage leading from the chamber on the seating side of the disk and governed by said main valve.

5. In combination with an air-brake system and a supplemental reservoir, a valve-casing having a main valve-chamber in communication with said reservoirs, a block or extension 22 secured to said casing and containing a chamber 21 communicating with the valve-chamber and having an exhaust-port 31, a valve operating in said valve-chamber and adapted to control said exhaust-port, a holding-disk operatively connected with said valve and having a stem extending in the chamber 21, and a spring arranged in the latter chamber tending to hold the disk to normal position, said disk being adapted to seat and to be held to shifted position by the exhaust of air-pressure from chamber 21.

6. In combination with an air-brake system and a supplemental reservoir, a valve-casing having a main valve-chamber in communication with said reservoirs, a block or extension 22 secured to said casing and containing a chamber 21 communicating with the valve-chamber and having an exhaust-port 31, a valve operating in said valve-chamber and adapted to control said exhaust-port, a holding-disk operatively connected with said valve and having a stem extending in the chamber 21, a spring arranged in the latter chamber tending to hold the disk to normal position, said disk being adapted to be held to seated position by exhaust of pressure from chamber 21, and rings 24 and 26 arranged to coöperate with shoulders formed on the disk-stem and against which the ends of the spring abut.

7. In combination with an air-brake system and a supplemental reservoir, a valve-casing having a main valve-chamber in communication with said reservoirs, a block or extension 22 secured to said casing and forming one wall of the valve-chamber, a gasket 29 arranged on said wall to form a seat, said extension arranged on said wall to form a seat, said extension having a chamber 21 communicating with the valve-chamber through an opening in said wall and gasket, a valve in said valve-chamber, a holding-disk also arranged therein and adapted to seat on said gasket, a disk-stem operatively connected with said valve and extending in chamber 21 through said opening, and a spring arranged in the latter chamber and acting to restore the disk and valve to normal position, said extension having an exhaust-port leading from chamber 21 and governed by said valve.

8. In combination with an air-brake system and a supplemental reservoir, a valve-casing having a chamber in communication with said reservoirs, a rotary valve operating in said chamber, means for establishing communication between said reservoirs for loaded-car braking, and mechanism for controlling said means comprising a holding-disk operatively connected with the valve and adapted to be seated in said chamber, said casing having an exhaust-port leading from the chamber on one side of the disk and governed by said valve.

9. In combination with an air-brake system and a supplemental reservoir, a valve-casing having a chamber in communication with said reservoirs, means arranged in said casing for establishing communication between said reservoirs for loaded-car braking, and a controller operating within said chamber for actuating and holding said means to its set position for such braking.

10. In combination with an air-brake system and a supplemental reservoir, a valve-casing having a chamber provided with passages adapted to communicate with said reservoirs respectively, means arranged in the passage to the supplemental-reservoir passage for establishing free communication from the supplemental reservoir to the chamber when adjusted for loaded-car braking, and a controller operating within said chamber for actuating and holding said means to adjusted position.

11. In combination with an air-brake system and a supplemental reservoir, a valve-casing having a chamber provided with passages adapted to communicate with said reservoirs respectively, means arranged in the passage to the supplemental-reservoir passage for establishing free communication from the supplemental reservoir to the chamber when adjusted for loaded-car braking, being arranged to prevent communication from the supplemental reservoir at other times, and a controller located in said chamber and operated by the pressure of the brake system of the car, said controller being adapted to actuate and hold said means to adjusted position.

12. In combination with an air-brake system and a supplemental reservoir arranged to be put into communication with the usual auxiliary reservoir, a check-valve arranged in such communication, and means for holding said valve open when opened for loaded-car braking.

13. In combination with an air-brake system and a supplemental reservoir arranged to be put into communication with the usual auxiliary reservoir, a check-valve arranged in such communication, and means dependent upon the presence of air-pressure in the system for holding said valve open when opened for loaded-car braking.

14. In combination with an air-brake system and a supplemental reservoir arranged to be put into communication with the usual auxiliary reservoir, a loaded check-valve arranged in such communication, and means for holding said valve open when opened for loaded-car braking.

15. In combination with an air-brake system and a supplemental reservoir arranged to be put into communication with the usual auxiliary reservoir, a check-valve arranged in such communication and spring-pressed to assure sufficient braking pressure in the auxiliary reservoir before the supplemental reservoir is charged, and a controller for holding the check-valve open when opened for loaded-car braking.

16. In combination with an air-brake system and a supplemental reservoir arranged to be put into communication with the usual auxiliary reservoir, a check-valve arranged in such communication and spring-pressed to assure sufficient braking pressure in the auxiliary reservoir before the supplemental reservoir is charged, and a controller controlled by the fluid-pressure of the brake system of the car for holding the check-valve open when opened for loaded-car braking.

17. In combination with an air-brake system and a supplemental reservoir arranged to be put into communication with the usual auxiliary reservoir for obtaining increased braking power, a valve-casing having a chamber communicating with said reservoirs, a check-valve normally closing the communication from the supplemental reservoir to the chamber and the auxiliary reservoir, and means adjustable for loaded-car braking for opening such check-valve.

18. In combination with an air-brake system and a supplemental reservoir arranged to be put into communication with the usual auxiliary reservoir for obtaining increased braking power, a valve-casing having a chamber communicating with said reservoirs, a check-valve normally closing the communication from the supplemental reservoir to the chamber and the auxiliary reservoir, adjustable means for opening such check-valve for loaded-car braking, and a controller for holding said means to adjusted position.

19. In combination with an air-brake system and a supplemental reservoir arranged to be put into communication with the usual auxiliary reservoir for obtaining increased braking power, a valve-casing having a chamber communicating with said reservoir, a check-valve normally closing the communication from the supplemental reservoir to the auxiliary reservoir, a movable member arranged to be adjusted to contact and open the check-valve, and means for holding such member in adjusted position so long as air-pressure remains on the car.

20. In combination with an air-brake system and a supplemental reservoir arranged to be put into communication with the usual auxiliary reservoir for obtaining increased braking power, a valve-casing having a chamber communicating with said reservoirs, a check-valve normally closing the communication from the supplemental reservoir to the auxiliary reservoir, a member movable in said chamber and adapted, when adjusted, to contact and open the check-valve, and means controlled by the pressure of the brake system of the car and coöperating with said member to hold it to adjusted position.

21. In combination with an air-brake system and a supplemental reservoir arranged to be put into communication with the usual auxiliary reservoir for obtaining increased braking power, a valve-casing having a chamber communicating with said reservoirs, a check-valve normally closing the communication from the supplemental reservoir to the auxiliary reservoir, said check-valve having a stem projecting into the chamber, a finger movable in said chamber and adapted, when moved or adjusted, to contact said valve-stem and open the check-valve, and means for holding said finger in adjusted position for loaded-car braking.

22. In combination with an air-brake system and a supplemental reservoir arranged to be put into communication with the usual auxiliary reservoir for obtaining increased braking power, a valve-casing having a chamber communicating with said reservoirs, a check-valve normally closing the communication from the supplemental reservoir to the auxiliary reservoir, said check-valve having a stem projecting into the chamber, a holding-disk operating in said chamber and arranged to be held by the pressure in such chamber when adjusted for loaded-car braking, and a finger carried by said disk and adapted to contact said valve-stem for opening the check-valve.

MAURY W. HIBBARD.

Witnesses:
S. E. HIBBEN,
LOUIS B. ERWIN.